(12) United States Patent
Nasum Subramanyam et al.

(10) Patent No.: US 11,483,181 B1
(45) Date of Patent: Oct. 25, 2022

(54) ISOLATED BIDIRECTIONAL COMMUNICATION CIRCUIT

(71) Applicant: Texas Instruments Incorporated, Dallas, TX (US)

(72) Inventors: Sreeram Nasum Subramanyam, Bengaluru (IN); Kashyap Jayendra Barot, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/246,867

(22) Filed: May 3, 2021

(51) Int. Cl.
*H04L 25/02* (2006.01)

(52) U.S. Cl.
CPC ...... *H04L 25/0266* (2013.01); *H04L 25/0272* (2013.01)

(58) Field of Classification Search
CPC .. H04B 3/36; H04B 3/50; H04L 25/02; H04L 25/0264; H04L 25/0266; H04L 25/0268; H04L 25/0272
USPC ......... 375/219, 220, 222, 257–259; 370/282, 370/293; 455/500, 73, 88
See application file for complete search history.

(56) References Cited

U.S. PATENT DOCUMENTS

| | | | |
|---|---|---|---|
| 6,351,530 B1 * | 2/2002 | Rahamim | H04M 11/06 379/93.07 |
| 11,240,070 B1 * | 2/2022 | Lin | H04L 27/06 |
| 2008/0317106 A1 * | 12/2008 | Leung | G06F 13/4278 375/220 |
| 2010/0284452 A1 * | 11/2010 | Allen | H04L 25/4917 375/220 |

FOREIGN PATENT DOCUMENTS

EP 2414943 B1 * 5/2016 ......... G06F 13/4072

* cited by examiner

*Primary Examiner* — Young T. Tse
(74) *Attorney, Agent, or Firm* — John R. Pessetto; Charles A. Brill; Frank D. Cimino (57) ABSTRACT

A bidirectional capacitive isolator includes a capacitive isolation network, a first transceiver circuit, and a second transceiver circuit. The capacitive isolation network includes a first port and a second port. The first transceiver circuit is coupled to the first port of the capacitive isolation network, and includes circuitry configured to cancel signal transmitted by the first transceiver circuit from signal received by the first transceiver circuit. The second transceiver circuit is coupled to the second port of the capacitive isolation network, and includes circuitry configured to cancel signal transmitted by the second transceiver circuit from signal received by the second transceiver circuit.

22 Claims, 4 Drawing Sheets

ISOLATED BIDIRECTIONAL COMMUNICATION CIRCUIT

BACKGROUND

Isolation is useful in electrical circuits to prevent the flow of direct currents and undesirable alternating currents between two parts of a system. While preventing flow of undesirable currents between parts of a system, isolation may allow signal transfer between the isolated parts of the system. Isolation may be provided by integrated circuits referred to as isolators. Electronic systems may include isolators for safety reasons and/or to protect electronic components of the systems (such as systems where one set of circuitry operates at a much higher voltage than another set of circuitry). For example, where two systems need to communicate, but the systems have grounds that may be at different potentials, communication may be through an isolator that is tied to the grounds of both systems, but which allows no current flow between the grounds. Various types of isolators may include optical coupling, capacitive coupling, inductive coupling (e.g., a transformer), or other types of coupling to isolate systems while allowing communication between the systems.

SUMMARY

In one example, a bidirectional capacitive isolator includes an isolation capacitor, a first transmitter coupling network, a transmitter circuit, a second transmitter coupling network, a first receiver coupling network, a receiver circuit, and a second receiver coupling network. The first transmitter coupling network is coupled to the isolation capacitor. The transmitter circuit includes an output coupled to the first transmitter coupling network. The second transmitter coupling network is coupled to the output of the transmitter circuit. The first receiver coupling network is coupled to the isolation capacitor. The receiver circuit includes an input coupled to the first receiver coupling network. The second receiver coupling network is coupled to the input of the receiver circuit and the second transmitter coupling network.

In another example, a bidirectional capacitive isolator includes an isolation capacitor, a transmitter circuit, a first transmitter coupling network, a receiver circuit, a first receiver coupling network, and a second transmitter coupling network. The transmitter circuit is configured to drive a transmit signal to the isolation capacitor. The first transmitter coupling network is configured to pass the transmit signal from the transmitter circuit to the isolation capacitor. The receiver circuit is configured to receive a receive signal from the isolation capacitor. The first receiver coupling network is configured to pass the receive signal from the isolation capacitor to the receiver circuit. The second transmitter coupling network is configured to pass the transmit signal from the transmitter circuit to the receiver circuit.

In a further example, a bidirectional capacitive isolator includes a capacitive isolation network, a first transceiver circuit, and a second transceiver circuit. The capacitive isolation network includes a first port and a second port. The first transceiver circuit is coupled to the first port of the capacitive isolation network, and includes circuitry configured to cancel signal transmitted by the first transceiver circuit from signal received by the first transceiver circuit. The second transceiver circuit is coupled to the second port of the capacitive isolation network, and includes circuitry configured to cancel signal transmitted by the second transceiver circuit from signal received by the second transceiver circuit.

In a yet further example, a transceiver has an input-output (I/O) adapted to be coupled to an isolation device. The transceiver includes a first transmitter coupling network, a first transmitter circuit, a second transmitter coupling network, a first receiver coupling network, a receiver, and a second receiver coupling network. The first transmitter coupling network is coupled to the isolation device. The transmitter circuit includes an output coupled to the first transmitter coupling network. The second transmitter coupling network is coupled to the output of the transmitter circuit. The first receiver coupling network is coupled to the isolation device. The receiver includes an input coupled to the first receiver coupling network. The second receiver coupling network is coupled to the input of the receiver and the second transmitter coupling network.

BRIEF DESCRIPTION OF THE DRAWINGS

For a detailed description of various examples, reference will now be made to the accompanying drawings in which.

The same reference numbers are used in the drawings to designate the same or similar (functionally and/or structurally) features.

DETAILED DESCRIPTION

In a digital isolator device (e.g., a capacitive isolator), a multi-channel configuration may be implemented by providing multiple differential physical channels in the device. For example, each differential physical channel serves as a single unidirectional communication channel. In such configurations, device cost increases linearly with channel count. To reduce cost, some devices implement multiplexing of physical channels. Device costs may also be reduced by applying frequency division multiple access (FDMA) in unidirectional devices. FDMA or time division multiple access (TDMA) may also be implemented in bidirectional channels to reduce device cost. However, with FDMA, very high-Q (high quality factor) filters are needed to cancel signals transmitted on a given side of the isolation from received signals. With TDMA, the predetermined transmission time intervals introduce undesirable jitter into the transmitted signals. The bidirectional capacitive isolators of some example embodiments apply FDMA with transmit signal cancellation to provide bidirectional communication over a single isolation channel without reducing channel bandwidth or introducing jitter.

Figure 1:
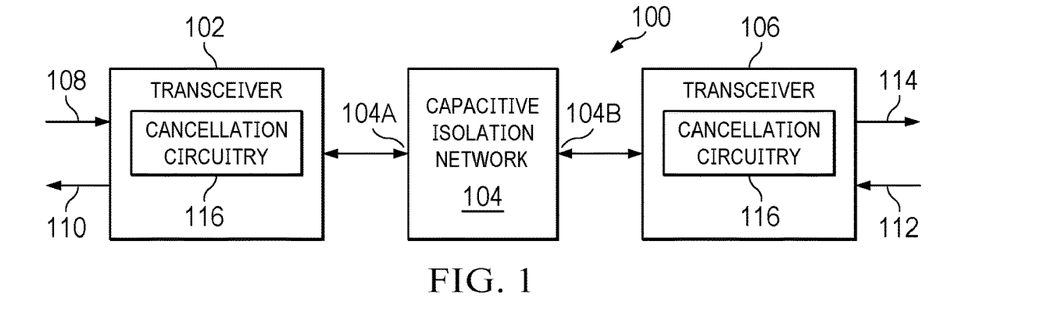
FIG. 1 shows a block diagram for an example bidirectional capacitive isolator.

FIG. 1 shows a block diagram for an example bidirectional capacitive isolator 100. The bidirectional capacitive isolator 100 includes a bidirectional transceiver 102, a capacitive isolation network 104, and a bidirectional transceiver 106. The capacitive isolation network 104 includes a port 104A and a port 104b. The bidirectional transceiver 102 is coupled to the port 104A, and the port 104b is coupled to the bidirectional transceiver 106. The bidirectional transceiver 102 receives the signal 108, and modulates and transmits the signal 108 to the bidirectional transceiver 106 via the capacitive isolation network 104. The bidirectional transceiver 106 receives the modulated signal 108 transmitted by the bidirectional transceiver 102, demodulates the received signal, and provides the demodulated, received signal as output signal 114. The bidirectional transceiver 106 receives the signal 112, and modulates and transmits the signal 112 to the bidirectional transceiver 102 via the capacitive isolation network 104. The bidirectional transceiver 102 receives the modulated signal 112 transmitted by the bidirectional transceiver 106, demodulates the received signal, and provides the demodulated, received signal as output signal 110. In some example embodiments, transceiver 102 operates at a different voltage than transceiver 106. In some example embodiments, the "ground" used by transceiver 102 is isolated (by isolation 104) from the "ground" used by transceiver 106.

The bidirectional transceiver 102 and the bidirectional transceiver 106 are capable of simultaneously transmitting the signal 108 and the signal 112 via the capacitive isolation network 104. The bidirectional transceiver 102 and the bidirectional transceiver 106 include cancellation circuitry 116 that attenuates the signal transmitted by the transceiver with respect to the signal received by the transceiver. The attenuation is provided by subtracting the transmitted signal from the received signal within the transceiver. For example, cancellation circuitry 116 of the bidirectional transceiver 102 reduces, within the bidirectional transceiver 102, the amplitude of the signal 108 with respect to the signal 112 received via the capacitive isolation network 104 by subtracting transmitted signal from received signal. Similarly, cancellation circuitry 116 of the bidirectional transceiver 106 reduces, within the bidirectional transceiver 106, the amplitude of the signal 112 with respect to the signal 108 received via the capacitive isolation network 104. Thus, the bidirectional transceiver 102 and the bidirectional transceiver 106 mitigate interference from transmitted signals to provide for reception of signals passing through via the capacitive isolation network 104.

Figure 2:
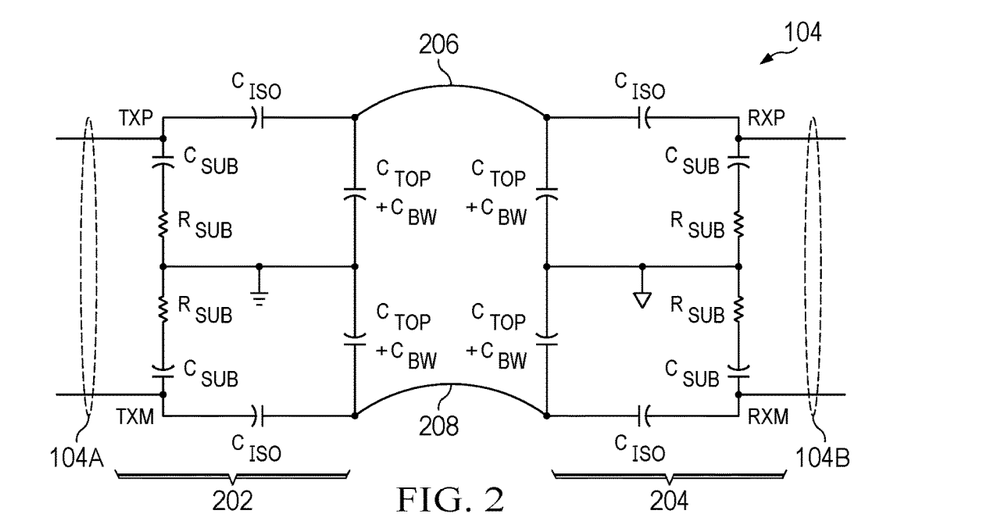
FIG. 2 shows a schematic diagram for an example equivalent circuit for a capacitive isolation network.
Figure 4:
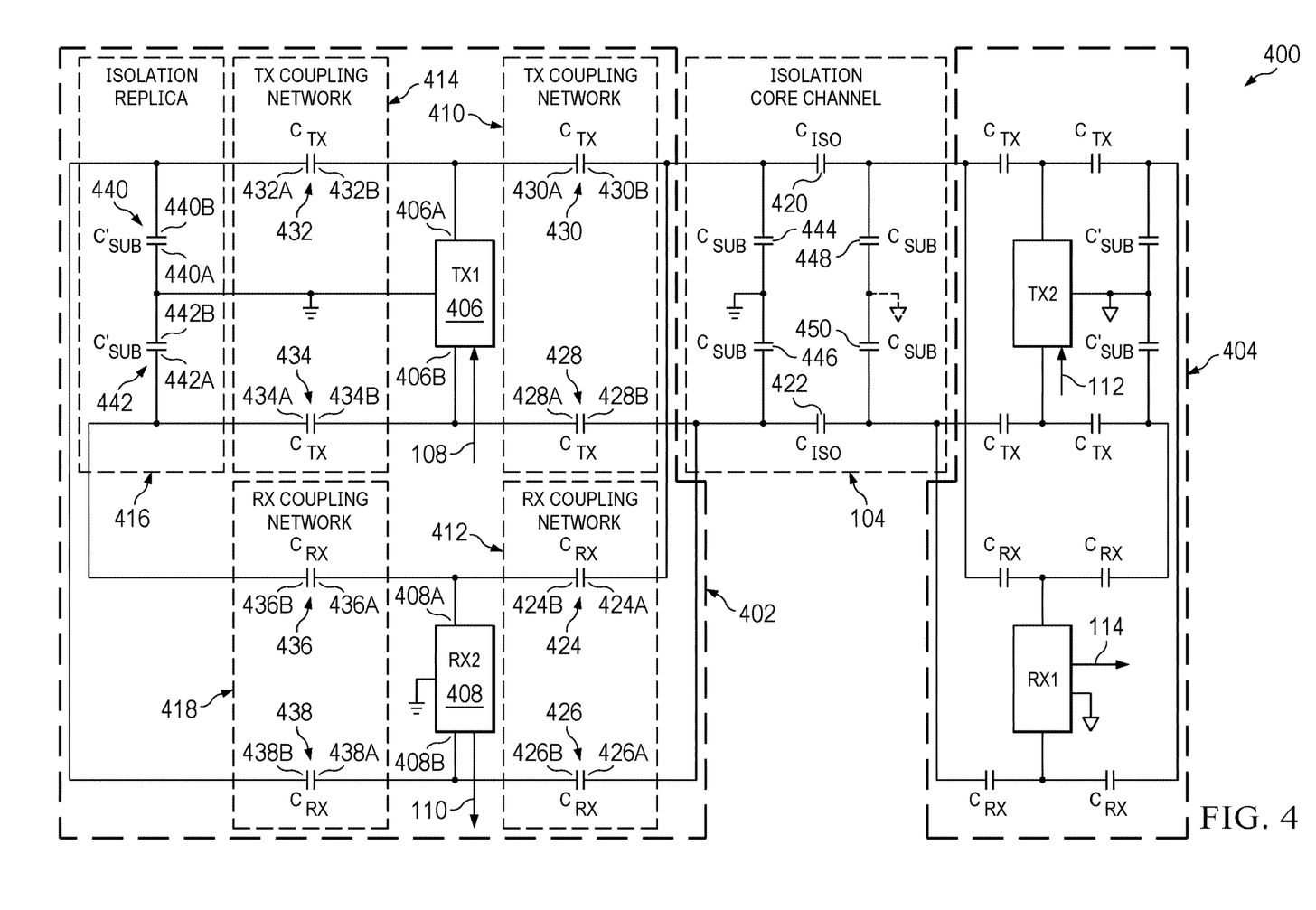
FIG. 4 shows a block diagram for an example bidirectional capacitive isolator.
Figure 5:
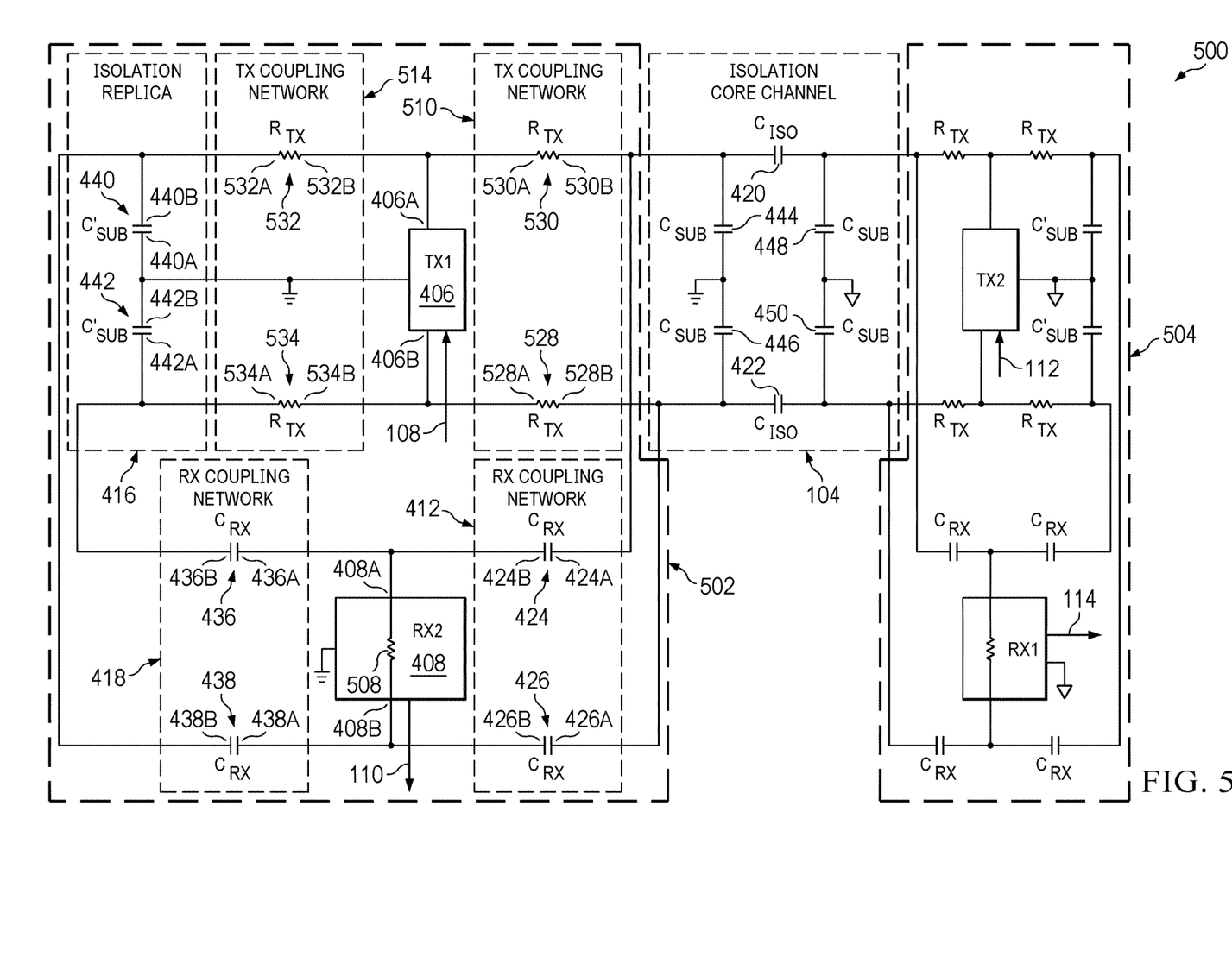
FIG. 5 shows a block diagram for an example bidirectional capacitive isolator.

FIG. 2 shows a schematic diagram for an example model for the capacitive isolation network 104 of the bidirectional capacitive isolator 100. In some implementations of the bidirectional capacitive isolator 100, the bidirectional transceiver 102 and portion 202 of the capacitive isolation network 104 are disposed on a first die, and the bidirectional transceiver 106 and portion 204 of the capacitive isolation network 104 are disposed on a second die. The first die and the second die are coupled by bond wires 206 and 208 to form the bidirectional capacitive isolator 100. In the model of FIG. 2, the capacitive isolation network 104 includes isolation capacitors $C_{ISO}$ and parasitic capacitors CSUB. In the bidirectional capacitive isolator 100, signal passes between the ports 104A and 104B via the isolation capacitors $C_{ISO}$. An isolation capacitor $C_{ISO}$ has capacitance of about 50 femtofarads (fF) in some implementations. A parasitic capacitor CSUB has capacitance of about 350 fF in some implementations. The isolation capacitors $C_{ISO}$ may be fabricated as parallel plate capacitors using top and bottom plates formed in two different metal layers of an integrated circuit (e.g., bottom plate in metal layer 2 and top plate in metal layer 5). The parasitic capacitors CSUB may be formed between the metal layer of the bottom plate of an isolation capacitor $C_{ISO}$ and the substrate of the integrated circuit. Due to the parasitic capacitors CSUB, signals passing through the capacitive isolation network 104 are substantially attenuated. For example, signals passing through the capacitive isolation network 104 are attenuated by a factor of 25 in some implementations. The attenuation of transmitted signal in the capacitive isolation network 104 increases the difficulty of bidirectional communication in the bidirectional capacitive isolator 100. The capacitive isolation network 104 also includes parasitic capacitors $C_{TOP}$ and $C_{BW}$ (combined in FIG. 2 as $C_{TOP}+C_{BW}$). $C_{TOP}$ is formed between the top plate of $C_{ISO}$ and ground on the die. $C_{BW}$ is capacitance from a bond wire (e.g., bond wire 206) to another bond wire (e.g., bond wire 208) or the lead frame (not shown). The cancellation circuitry 116 of bidirectional transceiver 102 and the bidirectional transceiver 106 includes components corresponding to at least a portion of the capacitive isolation network 104 to reduce same-side transmitter to receiver coupling within the transceivers, as shown in FIGS. 4 and 5.

Figure 3:
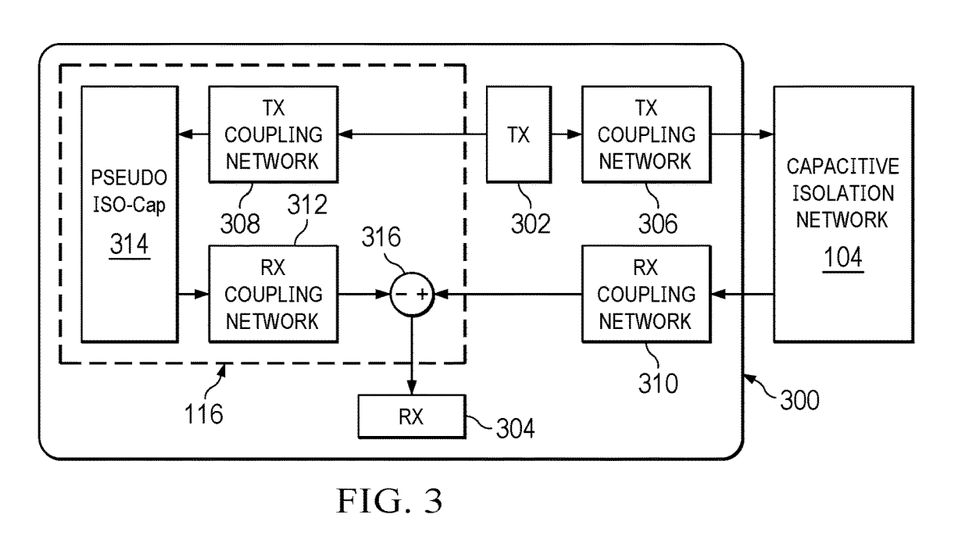
FIG. 3 shows a block diagram for an example bidirectional transceiver suitable for use in the bidirectional capacitive isolator of FIG. 1.

FIG. 3 shows a block diagram for an example bidirectional transceiver 300 suitable for use in the bidirectional capacitive isolator 100. The bidirectional transceiver 300 is an implementation of the bidirectional transceiver 102 or the bidirectional transceiver 106. The bidirectional transceiver 300 includes a transmitter circuit 302, a receiver circuit 304, a transmitter coupling network 306, a transmitter coupling network 308, a receiver coupling network 310, a receiver coupling network 312, and a replica capacitor network 314. The transmitter circuit 302 is coupled to the capacitive isolation network 104, via the transmitter coupling network 306, for transmission of a signal through the capacitive isolation network 104. The receiver circuit 304 is coupled to the capacitive isolation network 104, via the receiver coupling network 310, for receipt of a signal transmitted by a different instance of the bidirectional transceiver 300 that is also coupled to the capacitive isolation network 104.

The bidirectional transceiver 300 allows for simultaneous transmission by the transmitter circuit 302 and reception by the receiver circuit 304. The bidirectional transceiver 300 includes cancellation circuitry 116 that reduces the amplitude of signal transmitted by the transmitter circuit 302 at the receiver circuit 304. The cancellation circuitry 116 includes the transmitter coupling network 308, the replica capacitor network 314, the receiver coupling network 312, and the summing node 316. Signal transmitted by the transmitter circuit 302 is fed back to the receiver circuit 304 via the cancellation circuitry 116, and subtracted (at the summing node 316) from the signal received from the capacitive isolation network 104 via the receiver coupling network 310 to reduce the amplitude of the transmitted signal in the signal received at the input of the receiver circuit 304. The transmitter coupling network 308 is coupled to the transmitter circuit 302. The replica capacitor network 314 is coupled to the transmitter coupling network 308. The receiver coupling network 312 is coupled to the replica capacitor network 314 and the receiver circuit 304.

The transmitter coupling network 308 is similar or identical to the transmitter coupling network 306, and may provide attenuation and delay that are similar to that provided by the transmitter coupling network 306. The receiver coupling network 312 is similar or identical to the receiver coupling network 310, and may provide attenuation and delay that are similar to that provided by the receiver coupling network 310. The replica capacitor network 314 is similar or identical to the parasitic substrate capacitors of the capacitive isolation network 104. The replica capacitor network 314 may provide attenuation and delay that are similar to that provided by the parasitic substrate capacitors of the capacitive isolation network 104. Thus, the transmitter coupling network 308, the replica capacitor network 314, and the receiver coupling network 312 delay and attenuate the signal transmitted by the transmitter circuit 302 similarly to the transmitter coupling network 306, the capacitive isolation network 104, and the receiver coupling network 310 so that combination (subtraction) of the signals at the summing node 316 reduces the amplitude of the transmitted signal at the input of the receiver circuit 304.

FIG. 4 shows a block diagram for an example bidirectional capacitive isolator 400. The bidirectional capacitive isolator 400 is an implementation of the bidirectional capacitive isolator 100. The bidirectional capacitive isolator 400 includes a bidirectional transceiver 402, an instance of the capacitive isolation network 104, and a bidirectional transceiver 404. The bidirectional transceiver 404 is identical to the bidirectional transceiver 402 in some implementations, and description of the bidirectional transceiver 402 is applicable to the bidirectional transceiver 404. The bidirectional transceiver 402 is an implementation of the bidirectional transceiver 300. The bidirectional transceiver 402 and the bidirectional transceiver 404 are coupled to, and communicate via, the capacitive isolation network 104. The bidirectional transceiver 402 may be referenced to a different ground voltage than the bidirectional transceiver 404, as illustrated by use of different ground symbols in the bidirectional transceiver 402 and the bidirectional transceiver 404. The bidirectional capacitive isolator 400 enables communication between circuits coupled to the different grounds.

The capacitive isolation network 104 includes an isolation capacitor 420 and an isolation capacitor 422. Signal is transferred between the bidirectional transceiver 402 and the bidirectional transceiver 404 via the isolation capacitor 420 and the isolation capacitor 422. The capacitive isolation network 104 also includes parasitic substrate capacitors 444 and 446 that couple signal passing through the capacitive isolation network 104 to ground, thereby attenuating signal passing through the capacitive isolation network 104. The parasitic substrate capacitance of the capacitive isolation network 104 substantially attenuates (e.g., by a factor of 25) the signal passing from the bidirectional transceiver 402 to the bidirectional transceiver 404.

The bidirectional transceiver 402 includes a transmitter circuit 406, a receiver circuit 408, a transmitter coupling network 410, a receiver coupling network 412, a transmitter coupling network 414, an isolation replica capacitor network 416, and a receiver coupling network 418. The transmitter circuit 406 transmits signal to the capacitive isolation network 104 via the transmitter coupling network 410. The transmitter circuit 406 includes an output 406A and an output 406B for providing output signal to the transmitter coupling network 410. The transmitter coupling network 410 includes a capacitor 428 (a coupling element) and a capacitor 430 (a coupling element) that pass signal from the transmitter circuit 406 to the isolation capacitors 420 and 422. The capacitor 428 includes a terminal 428A coupled to the output 406B of the transmitter circuit 406, and a terminal 428B coupled to the isolation capacitor 422 of the capacitive isolation network 104. The capacitor 430 includes a terminal 430A coupled to the output 406A of the transmitter circuit 406, and a terminal 430B coupled to the isolation capacitor 420 of the capacitive isolation network 104.

The receiver circuit 408 receives, via the capacitive isolation network 104, signal transmitted by the bidirectional transceiver 404. The receiver circuit 408 includes an input 408A and an input 408B for receiving signal transmitted by the bidirectional transceiver 404. The receiver coupling network 412 is coupled to the receiver circuit 408 and the capacitive isolation network 104 for passing signal from the capacitive isolation network 104 to the receiver circuit 408. The receiver coupling network 412 includes a capacitor 424 and a capacitor 426 that pass signal from the isolation capacitors 420 and 422 to the receiver circuit 408. The capacitor 424 includes a terminal 424A coupled to the isolation capacitor 420 of the capacitive isolation network 104, and a terminal 424B coupled to the input 408A of the receiver circuit 408. The capacitor 426 includes a terminal 426A coupled to the isolation capacitor 422 of the capacitive isolation network 104, and a terminal 426B coupled to the input 408B of the receiver circuit 408.

Because the bidirectional transceiver 402 and the bidirectional transceiver 404 can transmit simultaneously, the signal received by the receiver circuit 408 via the receiver coupling network 412 includes signal transmitted by the transmitter circuit 406 that interferes with the signal transmitted by the bidirectional transceiver 404. The transmitter coupling network 414, the isolation replica capacitor network 416, and the receiver coupling network 418 form cancellation circuitry that compensates for the interfering signal transmitted by the transmitter circuit 406. Signal transmitted by the transmitter circuit 406 passes through the transmitter coupling network 414, the isolation replica capacitor network 416, and the receiver coupling network 418, and is added to signal received via the receiver coupling network 412 to attenuate the interfering signal received via the receiver coupling network 412. The signal received at the inputs 408A and 408B of the receiver circuit 408 via the receiver coupling network 418 is inverted relative to the signal received at the inputs 408A and 408B of the receiver circuit 408 via the receiver coupling network 412. This inversion of signals acts as summer 316 of FIG. 3.

The transmitter coupling network 414 is coupled to the transmitter circuit 406. The transmitter coupling network 414 is a replica of the transmitter coupling network 410. The transmitter coupling network 414 includes a capacitor 432 (a coupling element) and a capacitor 434 (a coupling element) that pass signal from the transmitter circuit 406 to the receiver circuit 408. The capacitor 432 includes a terminal 432B coupled to the output 406A of the transmitter circuit 406, and a terminal 432A coupled to the isolation replica capacitor network 416 and the receiver coupling network 418. The capacitor 434 includes a terminal 434B coupled to the output 406B of the transmitter circuit 406, and a terminal 434A coupled to the isolation replica capacitor network 416 and the receiver coupling network 418.

The isolation replica capacitor network 416 is coupled to the transmitter coupling network 414 and the receiver coupling network 418. The isolation replica capacitor network 416 is a replica of the parasitic substrate capacitors 444 and 446 of the capacitive isolation network 104. The isolation replica capacitor network 416 includes a capacitor 440 (an isolation replica capacitor) and a capacitor 442 (an isolation replica capacitor). The capacitor 440 includes a terminal 440B coupled to the terminal 432A of the capacitor 432, and a terminal 440A coupled to ground. The capacitor 442 includes a terminal 442A coupled to the terminal 434A of the capacitor 434, and a terminal 442B coupled to ground. The capacitances of the capacitor 440 and the capacitor 442 are selected, relative to the capacitances of the parasitic substrate capacitor 444 and the parasitic substrate capacitor 446, to cancel signal transmitted by the transmitter circuit 406 at the inputs 408A and 408B of the receiver circuit 408.

The receiver coupling network 418 is coupled to the receiver circuit 408, the transmitter coupling network 414, and the isolation replica capacitor network 416. The receiver coupling network 418 is a replica of the receiver coupling network 412. The receiver coupling network 418 includes a capacitor 436 and a capacitor 438 that pass signal from the transmitter circuit 406 to the receiver circuit 408. The capacitor 436 includes a terminal 436A coupled to the input 408A of the receiver circuit 408, and a terminal 436B coupled to the terminal 434A of the capacitor 434. The capacitor 438 includes a terminal 438A coupled to the input 408B of the receiver circuit 408, and a terminal 438B coupled to the terminal 432A of the capacitor 432.

The cancellation circuitry of the bidirectional transceiver 402 and the bidirectional transceiver 404 reduces the gain of signal transmitted between the bidirectional transceiver 402 and the bidirectional transceiver 404. Out of phase signal passing through the receiver coupling network 418 and the receiver coupling network 412 reduces signal amplitude across the parasitic substrate capacitor 444 and the parasitic substrate capacitor 446. Signal is further attenuated across the parasitic substrate capacitors 448 and 450 due to loading from the transmitter circuit of the bidirectional transceiver 404. Thus, the cancellation circuitry of the bidirectional capacitive isolator 400 increases the attenuation of transmitted signals. For example, the cancellation circuitry may increase the attenuation of signal (voltage) transmitted from the bidirectional transceiver 402 to the bidirectional transceiver 404 by about a factor of 10 (20 decibels), resulting in a total attenuation by a factor of about 250 (10*25, where attenuation by a factor of 25 is due to the isolation replica capacitor network 416) at the receiver of the bidirectional transceiver 404.

FIG. 5 shows a block diagram for an example bidirectional capacitive isolator 500. The bidirectional capacitive isolator 500 is similar to, but provides higher signal gain than, the bidirectional capacitive isolator 400. The bidirectional capacitive isolator 500 includes a bidirectional transceiver 502, an instance of the capacitive isolation network 104, and a bidirectional transceiver 504. The bidirectional transceiver 504 is identical to the bidirectional transceiver 502 in some implementations, and description of the bidirectional transceiver 502 is applicable to the bidirectional transceiver 504.

The bidirectional transceiver 502 includes the transmitter circuit 406, the receiver circuit 408, a transmitter coupling network 510, the receiver coupling network 412, a transmitter coupling network 514, the isolation replica capacitor network 416, and the receiver coupling network 418. The transmitter circuit 406 transmits signal to the capacitive isolation network 104 via the transmitter coupling network 510. To reduce loading, the transmitter coupling network 510 replaces the capacitors 428 and 430 of the transmitter coupling network 410 with resistors 528 and 530 that pass signal from the transmitter circuit 406 to the isolation capacitors 420 and 422. The resistor 528 (a coupling element) forms a low-pass filter with the parasitic substrate capacitor 446, and the resistor 530 (a coupling element) forms a low-pass filter with the parasitic substrate capacitor 444. The receiver circuit 408 includes an internal termination resistor 508 that forms a high-pass filter with the capacitors 424 and 426 of the receiver coupling network 412. The cut-off frequency of the low-pass filter formed by the transmitter coupling network 510 and the capacitive isolation network 104 is higher than the cut-off frequency of the high-pass filter formed by the internal termination resistor 508 and the receiver coupling network 412 to produce a band-pass filter. The frequency of the signal transmitted by the transmitter circuit 406 is at or near the peak frequency of the band-pass filter. For example, in an implementation, the transmitter circuit 406 transmits an on-off keying (OOK) signal with a 2 gigahertz (GHz) carrier, and the transmitter circuit of the bidirectional transceiver 504 transmits an OOK signal with a 1 GHz carrier. The receiver of the bidirectional transceiver 504 is tuned to detect the 2 GHz signal, and the receiver circuit 408 is tuned to detect the 1 GHz signal.

With the band-pass filtering provided by the bidirectional transceiver 502 and the bidirectional transceiver 504, the gain of signal between the bidirectional transceiver 502 and the bidirectional transceiver 504 is higher than the gain of the bidirectional capacitive isolator 400. For example, the signal gain of the bidirectional capacitive isolator 500 is three times that of the bidirectional capacitive isolator 400 in some implementations. Thus, voltage attenuation in the bidirectional capacitive isolator 500 may be about a factor of 75 rather than 250 as in the bidirectional capacitive isolator 400.

In the transmitter coupling network 510, the resistor 528 includes a terminal 528A coupled to the output 406B of the transmitter circuit 406, and a terminal 528B coupled to the isolation capacitor 422 of the capacitive isolation network 104. The resistor 530 includes a terminal 530A coupled to the output 406A of the transmitter circuit 406, and a terminal 530B coupled to the isolation capacitor 420 of the capacitive isolation network 104.

The transmitter coupling network 514 is a replica of the transmitter coupling network 510. The transmitter coupling network 514 includes a resistor 532 (a coupling element) and a resistor 534 (a coupling element) that pass signal from the transmitter circuit 406 to the receiver circuit 408. The resistor 532 includes a terminal 532B coupled to the output 406A of the transmitter circuit 406, and a terminal 532A coupled to the isolation replica capacitor network 416 and the receiver coupling network 418. The resistor 534 includes a terminal 534B coupled to the output 406B of the transmitter circuit 406, and a terminal 534A coupled to the isolation replica capacitor network 416 and the receiver coupling network 418.

Figure 6:
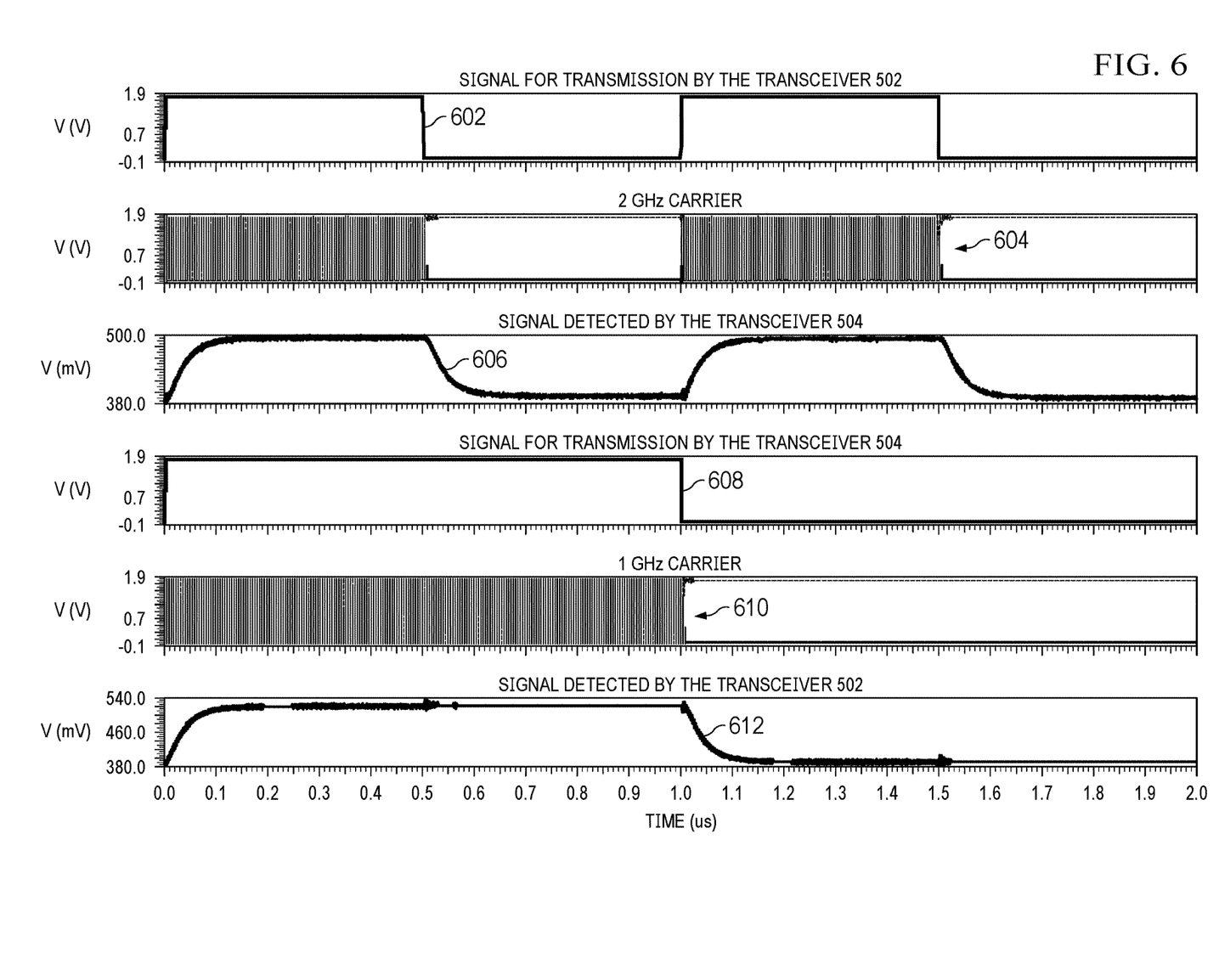
FIG. 6 shows example signals in a bidirectional capacitive isolator.

FIG. 6 shows example signals in the bidirectional capacitive isolator 500. In FIG. 6, the signal 602 is transmitted by the bidirectional transceiver 502 to the bidirectional transceiver 504, and simultaneously, the signal 608 is transmitted by the bidirectional transceiver 504 to the bidirectional transceiver 502. The signal 604 shows the signal 602 OOK encoded with a 2 GHz carrier for transmission through the capacitive isolation network 104. The signal 610 shows the signal 608 OOK encoded with a 1 GHz carrier for transmission through the capacitive isolation network 104. The signal 606 is the signal 602 as detected in the bidirectional transceiver 504. The signal 612 is the signal 608 detected in the bidirectional transceiver 502. FIG. 6 shows that, in the bidirectional capacitive isolator 500, transmission of the signal 608 does not interfere with reception of the signal 602, and transmission of the signal 602 does not interfere with reception of the signal 608.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. A bidirectional capacitive isolator, comprising:
   an isolation capacitor;
   a first transmitter coupling network coupled to the isolation capacitor;
   a transmitter circuit comprising an output coupled to the first transmitter coupling network;
   a second transmitter coupling network coupled to the output of the transmitter circuit;
   a first receiver coupling network coupled to the isolation capacitor;
   a receiver circuit comprising an input coupled to the first receiver coupling network; and
   a second receiver coupling network coupled to the input of the receiver circuit and the second transmitter coupling network.

2. The bidirectional capacitive isolator of claim 1, wherein:
   the isolation capacitor is a first isolation capacitor;
   the output of the transmitter circuit is a first output; and
   the input of the receiver circuit is a first input; and
   the bidirectional capacitive isolator further comprises:
      a second isolation capacitor coupled to the first transmitter coupling network;
   the transmitter circuit further comprises a second output coupled to the first transmitter coupling network and the second transmitter coupling network; and
   the receiver circuit further comprises a second input coupled to the first receiver coupling network and the second receiver coupling network.

3. The bidirectional capacitive isolator of claim 2, wherein the first receiver coupling network comprises:
   a first capacitor comprising:
      a first terminal coupled to the first isolation capacitor; and
      a second terminal coupled to the first input of the receiver circuit; and
   a second capacitor comprising:
      a first terminal coupled to the second isolation capacitor; and
      a second terminal coupled to the second input of the receiver circuit.

4. The bidirectional capacitive isolator of claim 2, wherein the first transmitter coupling network comprises:
   a first coupling element comprising:
      a first terminal coupled to the first isolation capacitor; and
      a second terminal coupled to the first output of the transmitter circuit; and
   a second coupling element comprising:
      a first terminal coupled to the second isolation capacitor; and
      a second terminal coupled to the second output of the transmitter circuit;
   wherein:
      the first coupling element and the second coupling element are capacitors; or
      the first coupling element and the second coupling element are resistors.

5. The bidirectional capacitive isolator of claim 2, wherein the second transmitter coupling network comprises:
   a first coupling element comprising:
      a first terminal coupled to the first output of the transmitter circuit; and
      a second terminal; and
   a second coupling element comprising:
      a first terminal coupled to the second output of the transmitter circuit; and
      a second terminal;
   wherein:
      the first coupling element and the second coupling element are capacitors; or
      the first coupling element and the second coupling element are resistors.

6. The bidirectional capacitive isolator of claim 5, wherein the second receiver coupling network comprises:
a first capacitor comprising:
a first terminal coupled to the first input of the receiver circuit; and
a second terminal coupled to the second terminal of the second coupling element; and
a second capacitor comprising:
a first terminal coupled to the second input of the receiver circuit; and
a second terminal coupled to the second terminal of the first coupling element.

7. The bidirectional capacitive isolator of claim 5, further comprising:
a first isolation replica capacitor comprising:
a first terminal coupled to the second terminal of the first coupling element; and
a second terminal coupled to ground; and
a second isolation replica capacitor comprising:
a first terminal coupled to the second terminal of the second coupling element; and
a second terminal coupled to the ground.

8. A bidirectional capacitive isolator, comprising:
an isolation capacitor;
a first transmitter coupling network coupled to the isolation capacitor;
a transmitter circuit coupled to the first transmitter coupling network and configured to transmit a transmit signal to the isolation capacitor via the first transmitter coupling network;
a first receiver coupling network coupled to the isolation capacitor;
a receiver circuit configured to receive a receive signal from the isolation capacitor via the first receiver coupling network; and
a second transmitter coupling network configured to pass the transmit signal from the transmitter circuit to the receiver circuit.

9. The bidirectional capacitive isolator of claim 8, further comprising a second receiver coupling network configured to pass the transmit signal from the second transmitter coupling network to the receiver circuit.

10. The bidirectional capacitive isolator of claim 9, wherein the second receiver coupling network comprises a capacitor configured to pass the transmit signal from the second transmitter coupling network to the receiver circuit.

11. The bidirectional capacitive isolator of claim 9, further comprising a replica capacitor coupled to the second transmitter coupling network and the second receiver coupling network, wherein the replica capacitor is a replica of a parasitic capacitor coupled to the isolation capacitor.

12. The bidirectional capacitive isolator of claim 8, wherein the first receiver coupling network comprises a capacitor configured to pass the receive signal from the isolation capacitor to the receiver circuit.

13. The bidirectional capacitive isolator of claim 8, wherein:
the first transmitter coupling network comprises a first capacitor configured to pass the transmit signal from the transmitter circuit to the isolation capacitor; and
the second transmitter coupling network comprises a second capacitor configured to pass the transmit signal from the transmitter circuit to the receiver circuit.

14. The bidirectional capacitive isolator of claim 8, wherein:
the first transmitter coupling network comprises a first resistor configured to pass the transmit signal from the transmitter circuit to the isolation capacitor; and
the second transmitter coupling network comprises a second resistor configured to pass the transmit signal from the transmitter circuit to the receiver circuit.

15. A bidirectional capacitive isolator, comprising:
a capacitive isolation network comprising a first port and a second port;
a first transceiver circuit coupled to the first port of the capacitive isolation network, and comprising circuitry configured to cancel signal transmitted by the first transceiver circuit from signal received by the first transceiver circuit; and
a second transceiver circuit coupled to the second port of the capacitive isolation network, and comprising circuitry configured to cancel signal transmitted by the second transceiver circuit from signal received by the second transceiver circuit;
wherein the first transceiver circuit comprises:
a transmitter circuit comprising an output configured to drive a transmit signal to the first port of the capacitive isolation network;
a first transmitter coupling network configured to pass the transmit signal from the output of the transmitter circuit to the first port of the capacitive isolation network;
a receiver circuit comprising an input configured to receive a receive signal from the first port of the capacitive isolation network;
a first receiver coupling network configured to pass the receive signal from the first port of the capacitive isolation network to the input of the receiver circuit;
a second transmitter coupling network configured to pass the transmit signal from the output of the transmitter circuit to the input of the receiver circuit; and
a second receiver coupling network configured to pass the transmit signal from the second transmitter coupling network to the input of the receiver circuit.

16. The bidirectional capacitive isolator of claim 15, wherein:
the first receiver coupling network comprises a capacitor configured to pass the receive signal from the first port of the capacitive isolation network to the input of the receiver circuit; and
the second receiver coupling network comprises a second capacitor configured to pass the transmit signal from the second transmitter coupling network to the input of the receiver circuit.

17. The bidirectional capacitive isolator of claim 15, wherein:
the first transmitter coupling network comprises a first capacitor configured to pass the transmit signal from the output of the transmitter circuit to the capacitive isolation network; and
the second transmitter coupling network comprises a second capacitor configured to pass the transmit signal from the output of the transmitter circuit to the input of the receiver circuit.

18. The bidirectional capacitive isolator of claim 15, wherein:
the first transmitter coupling network comprises a first resistor configured to pass the transmit signal from the output of the transmitter circuit to the capacitive isolation network; and the second transmitter coupling network comprises a second resistor configured to pass the transmit signal from the output of the transmitter circuit to the input of the receiver circuit.

19. The bidirectional capacitive isolator of claim 15, wherein:
the first transceiver circuit further comprises a replica capacitor network coupled to the second transmitter coupling network and the second receiver coupling network, wherein the replica capacitor network is a replica of substrate capacitors of the capacitive isolation network.

20. A transceiver having an input-output (I/O) adapted to be coupled to an isolation device, the transceiver comprising:
a first transmitter coupling network coupled to the isolation device;
a transmitter circuit comprising an output coupled to the first transmitter coupling network;
a second transmitter coupling network coupled to the output of the transmitter circuit;
a first receiver coupling network coupled to the isolation device;
a receiver comprising an input coupled to the first receiver coupling network; and
a second receiver coupling network coupled to the input of the receiver and the second transmitter coupling network.

21. The transceiver of claim 20, wherein the isolation device is a capacitive isolation device.

22. The transceiver of claim 20, wherein the transceiver is a first transceiver and the transmitter is operable to transmit data modulated on a carrier frequency to a second transceiver via the isolation device.

\* \* \* \* \*